Feb. 9, 1937.  A. T. SWEET ET AL  2,070,496
PROCESS OF OBTAINING MANGANESE VALUES FROM CARBONATE ORES
Filed Sept. 16, 1929
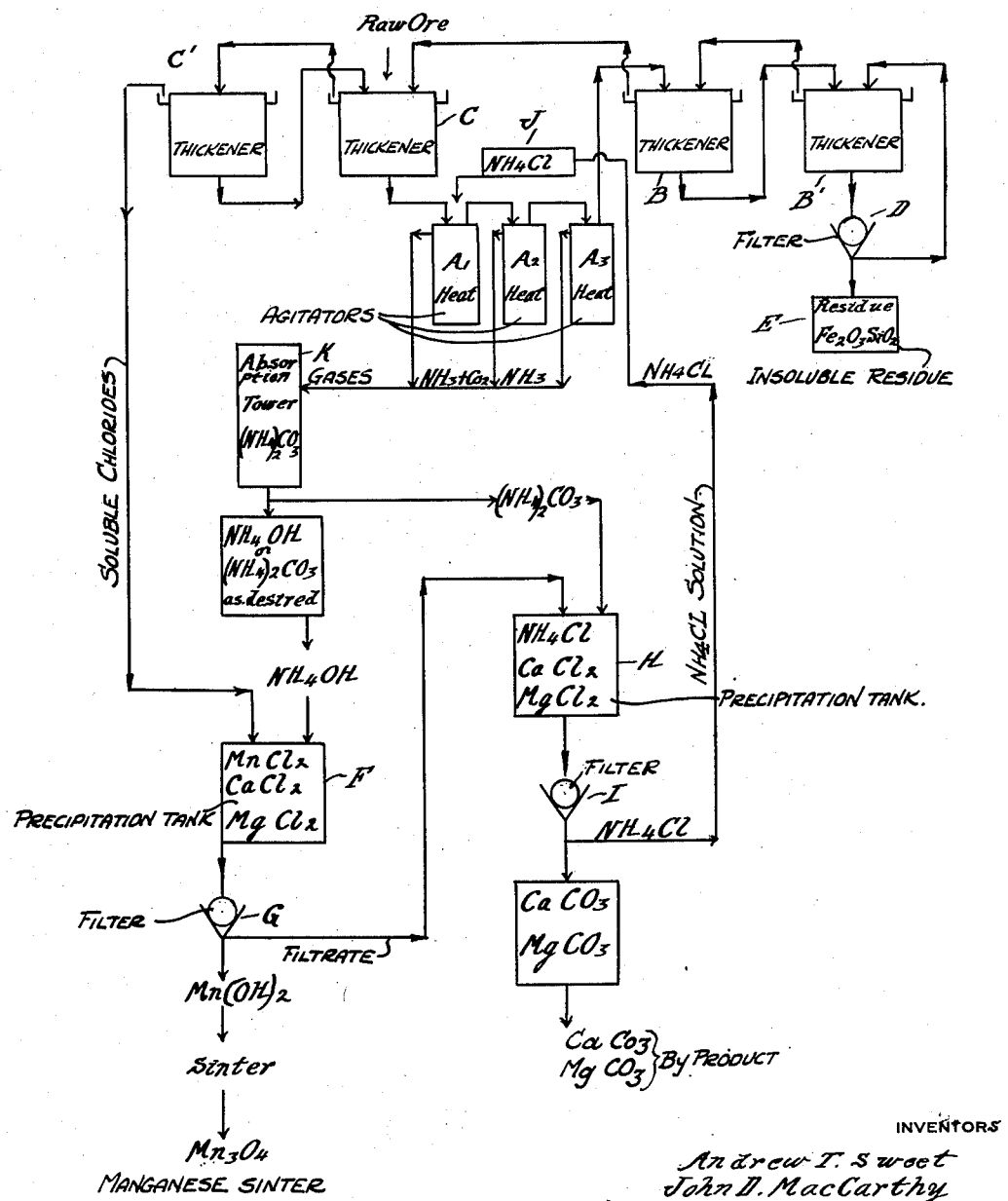
INVENTORS
Andrew T. Sweet
John D. MacCarthy
BY Whittemore Hulbert
Whittemore Belknap
ATTORNEYS Patented Feb. 9, 1937

2,070,496

UNITED STATES PATENT OFFICE 2,070,496

PROCESS OF OBTAINING MANGANESE VALUES FROM CARBONATE ORES

Andrew T. Sweet, Houghton, and John D. MacCarthy, Detroit, Mich., assignors to General Manganese Corporation, Detroit, Mich., a corporation of Delaware Application September 16, 1929, Serial No. 392,983

13 Claims. (Cl. 75—103)

The invention relates to the extraction of metals from ores and is more particularly applicable to the treatment of low grade ores. It is the primary object of the invention to simplify the process and to reduce the cost of extraction so that it may be succesfully and economically used on low grade ores. It is a further object to obtain a cyclic process in which the reagents used in treating the ore for the extraction of the metal are recovered and utilized for a repetition of the process. To this end the invention consists first in the novel means for rendering the desired constituents soluble so that they may be readily removed from the gangue by leaching, further, in various novel features as hereinafter set forth.

Our improvement is applicable to the treatment of ores containing different metals and in different chemical compounds, but it is particularly useful in the extraction of manganese from certain ores in which it is associated with other metals in the form of carbonates or oxides. A specific example is a low grade manganese carbonate ore found in South Dakota of the following general approximate analysis:

| | | Per cent |
|---|---|---|
| Dried 212° | Mn | 16.00 |
| | Fe | 11.00 |
| | P | .429 |
| | $SiO_2$ | 13.00 |
| | MgO | 1.80 |
| | CaO | 15.00 |
| | $Al_2O_3$ | 2.70 |
| | $CO_2$ loss | 28.00 |
| | Approximate loss on ignition | 6.00 |

In the above the manganese as well as the iron, magnesium and calcium constituents are in the form of insoluble carbonates and the first step of our process is to convert these into soluble salts. Heretofore it has been considered necessary to roast the ore prior to chemical treatment. We have discovered that this preliminary roasting step is unnecessary and that the desired metallic compounds may be rendered soluble in several ways, among which are first, leaching of the raw ore with a water solution of a reagent which first converts the carbonates into soluble salts and then dissolves the latter to permit of separating the same from the gangue; second, roasting with a reagent which during the heat treatment converts the carbonates to soluble salts which may then be removed by leaching. It is highly desirable to obtain a cyclic process and we have further discovered that this may be accomplished with either of the modifications just described by the use of a compound reagent having a gaseous base such for instance as ammonium salt. We have found that either ammonium sulphate or ammonium chloride is suitable for the purpose.

While in its broader features our improved process is applicable to the treatment of various ores containing the desired metals in other compounds than carbonates and while as above stated we may use either the roasting or the leaching step, we shall in the present application confine this specific description to the leaching process which is diagrammatically represented by the flow sheet in the accompanying drawing.

The crushed ore is treated by an ammonium salt solution such as ammonium chloride. This step is preferably carried out in agitators $A'$, $A^2$, $A^3$, the ammonium solution being kept by the application of heat at substantially boiling temperature. In these agitators the manganese, some iron, calcium and magnesium which were originally carbonates are converted into chlorides with the evolution of ammonia gas ($NH_3$) and carbon dioxide gas ($CO_2$). These gases are collected in the usual manner in an absorption tower K forming ammonium carbonate $(NH_4)_2CO_3$.

In the next step the solution and residue are passed to B where the liquid is separated from the solid, the solution passing on to C and the solids to $B'$, thence after washing and filtration at D to waste E, this containing the iron and silica and other insoluble constituents.

The solution entering C contains manganese chloride $MnCl_2$, some iron chloride $FeCl_2$, magnesium chloride $MgCl_2$, calcium chloride $CaCl_2$. Raw ore is added to the solution in C and the remaining iron chloride in the solution reacts with the manganese, calcium and magnesium in the ore forming more chlorides and precipitating the iron. The ore after treatment in C passes to the agitators $A'$, $A^2$, $A^3$ above described, and thus the iron content eventually finds its way into the residue.

The next step in the process is that of precipitating the desired metal compound and/or the separation or differential precipitation of the desired metal compounds, which procedure depends entirely upon the elements present, their respective quantities, and their respective solubilities or insolubilities, as they might occur in the ore being treated. For example, in the processing of the ores cited above the following procedure would be preferable as has been outlined on the accompanying flow sheet.

The chloride solution freed from most of the iron passes from C to C' and thence to F where the manganese is precipitated. The precipitant used is preferably ammonium hydroxide NH₄OH which is derived from a portion of the ammonium carbonate (by the action of calcium oxide) and which will precipitate the manganese hydroxide without affecting the other chlorides in solution. After filtration at G the solution is passed to H in which it is treated with ammonium carbonate precipitating calcium carbonate $CaCO_3$ and magnesium carbonate $MgCO_3$. This leaves in the solution only ammonium chloride which has been re-formed as a result of the several precipitations. Thus after filtration at I the ammonium chloride solution is returned to J from which it again passes to A', A², A³.

The manganese hydroxide $Mn(OH_2)$ is sintered to reduce it to mangano manganic oxide $Mn_3O_4$. The calcium carbonate and magnesium carbonate removed by the filter I may be calcined forming magnesium oxide MgO, calcium oxide CaO, and carbon dioxide $CO_2$.

While the above procedure is preferable in treating the ores specifically used for an example of the process, it is within the scope of the invention to treat other manganese ores containing the same or other associated minerals present in the same quantities or present in variable quantities, or as less soluble compounds, or as insoluble compounds. It is obvious at once that minor changes in the manner and methods of precipitation are necessary to precipitate the desired metal compounds or to effect a differential precipitation as desired.

As a further example of this feature, it will be noted by reference to the flow sheet that provision has been made for the alternative use of ammonium hydroxide or ammonium carbonate as desired in the tank F containing the soluble salts, for the reason that it may be desirable to precipitate the manganese and magnesium or other soluble compounds in a single precipitation step. In an ore containing magnesium and lime as insolubles, or as solubles in small quantities, or one containing no magnesium and lime at all, the flow sheet would be simplified in that the soluble manganese salts containing some, or no other soluble salts would be treated with an ammonium compound derived from at least one of the said gases in a single precipitation step. In this case the manganese compound is precipitated along with or without such quantities of magnesium compounds and other associated compounds present in the particular ore as soluble constituents. The single precipitation thereby reforms the ammonium salt. Other deviations made necessary through the use of ammonium sulphate as the reagent instead of ammonium chloride due to the variation in the different solubilities of the metal sulphate compounds may be had by reference to our co-pending application, Serial No. 394,677, filed September 23, 1929.

It will be noted that in the complete cycle the end products do not contain any portion of the reagent ammonium chloride which was used for the first step of the process. Further, that the precipitants used in the succeeding steps are derived from the ammonium chloride and eventually are re-converted thereinto. Thus the process is completely cyclic.

What we claim as our invention is:

1. The process of extracting manganese compounds from carbonate ores containing manganese carbonate, silica and compounds of iron, magnesium and calcium which comprises treating the ore with a solution of ammonium chloride at substantially boiling temperatures thereby resulting in the evolution of ammonia and carbon dioxide gases, combining these gases to produce ammonium carbonate, separating the soluble chlorides of manganese, calcium and magnesium from the insoluble iron-silica residue, precipitating the manganese from said soluble chlorides by ammonium hydroxide obtained from said ammonium carbonate leaving a filtrate containing the chlorides of calcium, magnesium and ammonium, adding ammonium carbonate to said filtrate thereby precipitating the carbonates of calcium and magnesium and regenerating ammonium chloride, and utilizing said ammonium chloride to repeat the cycle.

2. The process of recovering manganese compounds from carbonate ores which comprises treating the ore with a solution of an amonium salt at substantially boiling temperatures capable of forming soluble manganese salts and resulting in the evolution of ammonia and carbon dioxide gases and separating and recovering soluble manganese salts from the insoluble residue.

3. The process of recovering manganese compounds from carbonate ores which comprises treating the ore with a solution of ammonium chloride at substantially boiling temperatures to form soluble manganese chloride and resulting in the evolution of ammonia and carbon dioxide gases and separating and recovering the soluble manganese chloride from the insoluble residue.

4. The process of recovering manganese compounds from carbonate ores which comprises treating the ore with a solution of an ammonium salt at substantially boiling temperatures capable of forming soluble manganese salts and resulting in the evolution of ammonia and carbon dioxide gases, separating the soluble manganese salt from the insoluble residue and precipitating from the solution an insoluble manganese compound.

5. The process of recovering manganese compounds from carbonate ores which comprises treating the ore with a solution of ammonium chloride at substantially boiling temperatures to form soluble manganese chloride and resulting in the evolution of ammonia and carbon dioxide gases, separating the soluble manganese chloride from the insoluble residue and precipitating from the solution an insoluble manganese compound.

6. The process of recovering manganese compounds from carbonate ores which comprises treating the ore with a solution of ammonium chloride at substantially boiling temperatures to form soluble manganese chloride and resulting in the evolution of ammonia and carbon dioxide gases, separating the soluble manganese chloride from the insoluble residue, precipitating from the solution an insoluble manganese compound with an ammonium compound derived from at least one of said gases capable of forming an insoluble manganese compound and reforming ammonium chloride and utilizing the latter in order to repeat the cycle.

7. The process of recovering manganese and magnesium compounds from carbonate ores which comprises treating the ore with a solution of ammonium chloride at substantially boiling temperatures to form the soluble chlorides of manganese and magnesium and resulting in the evolution of ammonia and carbon dioxide gases, separating the soluble chlorides from the insoluble compounds, precipitating insoluble manganese and magnesium compounds from the solution with an ammonium compound derived from at least one of said gases thereby reforming ammonium chloride and separating and recovering the ammonium chloride in order to repeat the cycle.

8. The process of recovering manganese compounds from carbonate ores containing manganese carbonate, iron and insoluble compounds which comprises treating the ore with a solution of ammonium chloride at substantially boiling temperatures to form soluble manganese chloride and resulting in the evolution of ammonia and carbon dioxide gases, separating the soluble manganese chloride from the insoluble residue, precipitating the manganese compound from the solution with an ammonium compound derived from at least one of said gases capable of forming an insoluble manganese compound and reforming ammonium chloride and separating and recovering the ammonium chloride in order to repeat the cycle.

9. The process of recovering manganese, magnesium and calcium compounds from carbonate ores which comprises treating the ore with a solution of ammonium chloride at substantially boiling temperatures to form the soluble chlorides of manganese, magnesium and calcium and resulting in the evolution of ammonia and carbon dioxide gases, separating the soluble chlorides from the insoluble residue, precipitating insoluble manganese, magnesium and calcium compounds from the solution with an ammonium compound derived from at least one of said gases thereby reforming ammonium chloride and separating and recovering the ammonium chloride in order to repeat the cycle.

10. The process of recovering metal compounds from carbonate ores containing manganese, magnesium and calcium carbonates, iron and insoluble compounds which comprises treating the ore with a solution of ammonium chloride at substantially boiling temperatures to form the soluble chlorides of manganese, magnesium and calcium and resulting in the evolution of ammonia and carbon dioxide gases, separating the soluble chlorides from the insoluble compounds, precipitating insoluble manganese, magnesium and calcium compounds from the solution with an ammonium compound derived from at least one of said gases thereby reforming ammonium chloride and separating and recovering the ammonium chloride in order to repeat the cycle.

11. The process of recovering metal compounds from carbonate ores containing manganese, magnesium and calcium carbonates which comprises treating the ore with a solution of ammonium chloride at substantially boiling temperatures to form the soluble chlorides of manganese, magnesium and calcium and resulting in the evolution of ammonia and carbon dioxide gases, separating the soluble chlorides from the insoluble residue, precipitating insoluble manganese hydroxide from the solution with ammonium hydroxide derived from said gases thereby reforming ammonium chloride, separating and treating the remaining soluble chlorides of magnesium, calcium and ammonium with ammonium carbonate derived from the said ammonia and carbon dioxide gases to precipitate insoluble magnesium and calcium carbonates and to reform ammonium chloride and separating and recovering the ammonium chloride resulting from the several precipitations in order to repeat the cycle.

12. The process of recovering metal compounds from carbonate ores containing manganese, magnesium and calcium carbonates, iron and insoluble compounds which comprises treating the ore with a solution of ammonium chloride at substantially boiling temperatures to form the soluble chlorides of manganese, magnesium and calcium and resulting in the evolution of ammonia and carbon dioxide gases, separating the soluble chlorides from the insoluble residue, precipitating insoluble manganese hydroxide from the solution with ammonium hydroxide derived from said gases thereby reforming ammonium chloride, separating and treating the remaining soluble chlorides of magnesium, calcium and ammonium with ammonium carbonate derived from the said ammonia and carbon dioxide gases to precipitate insoluble magnesium and calcium carbonates and to reform ammonium chloride and separating and recovering the ammonium chloride resulting from the several precipitations in order to repeat the cycle.

13. The process of recovering metal compounds from ores containing manganese, magnesium and calcium carbonates, iron and insoluble compounds which comprises treating the ore with a solution of ammonium chloride at substantially boiling temperatures to form the soluble chlorides of manganese, magnesium and calcium and resulting in the evolution of ammonia and carbon dioxide gases, separating the soluble chlorides from the insoluble residue, precipitating insoluble manganese hydroxide from the solution with ammonium hydroxide derived from said gases thereby reforming ammonium chloride, separating and treating the remaining soluble chlorides of magnesium, calcium and ammonium with ammonium carbonate derived from the said ammonia and carbon dioxide gases to precipitate insoluble magnesium and calcium carbonates and to reform ammonium chloride and separating and recovering the ammonium chloride resulting from the several precipitations in order to repeat the cycle.

ANDREW T. SWEET.
JOHN D. MacCARTHY.